United States Patent
Morita et al.

(10) Patent No.: US 7,506,718 B2
(45) Date of Patent: Mar. 24, 2009

(54) UTILITY VEHICLE AND ASSEMBLY OF ENGINE AND TRANSMISSION FOR UTILITY VEHICLE

(75) Inventors: Taisuke Morita, Itami (JP); Hiroyuki Fujimoto, Akashi (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 735 days.

(21) Appl. No.: 11/223,756

(22) Filed: Sep. 9, 2005

(65) Prior Publication Data

US 2006/0058138 A1     Mar. 16, 2006

(30) Foreign Application Priority Data

Sep. 15, 2004    (JP) .............................. 2004-267835

(51) Int. Cl.
  *B60K 17/22* (2006.01)
(52) U.S. Cl. ........................... 180/376; 180/374; 474/8; 475/210
(58) Field of Classification Search ................. 180/376, 180/346, 374, 377, 378, 379, 383; 475/206, 475/210; 474/8
See application file for complete search history.

(56) References Cited

U.S. PATENT DOCUMENTS 5,295,920 A * 3/1994 Sawasaki et al. ............ 475/210
6,332,856 B1 * 12/2001 Iwamoto ...................... 475/210
6,508,222 B2 * 1/2003 Takano .................. 123/195 AC
7,037,225 B2 * 5/2006 Takagi ............................ 474/8
7,240,758 B2 * 7/2007 Korenjak et al. ............ 180/292

FOREIGN PATENT DOCUMENTS

JP    HEI 8-61469      3/1996
JP    2000-190747      11/2000

* cited by examiner

*Primary Examiner*—Christopher P Ellis
*Assistant Examiner*—John D. Walters
(74) *Attorney, Agent, or Firm*—Alleman Hall McCoy Russell & Tuttle LLP

(57) ABSTRACT

An assembly of an engine and a transmission is disclosed. An output shaft of the engine and an input shaft of the transmission extends in parallel to protrude from the assembly. The assembly typically comprises a first fitting portion that is formed in a crankcase of the engine and is configured to surround the output shaft, a second fitting portion that is formed in a housing of the transmission and is configured to surround the input shaft, and a coupling element having a first opening fitted to the first fitting portion and a second opening fitted to the second fitting portion. A center distance between the output shaft and the input shaft is fixed with the coupling element fitted to the first and second fitting portions.

8 Claims, 7 Drawing Sheets

UTILITY VEHICLE AND ASSEMBLY OF ENGINE AND TRANSMISSION FOR UTILITY VEHICLE

BACKGROUND OF THE INVENTION

1. Technical Field

The present invention generally relates to an assembly of an engine and a transmission, and a utility vehicle equipped with the assembly. More particularly, the present invention relates to an assembly of an engine and a transmission that is mounted in vehicles such as two-wheel-drive utility vehicles and four-wheel-drive utility vehicles, and a utility vehicle equipped with the assembly.

2. Description of the Related Art

Conventionally, it has been known that a reinforcing element is used to provide a firm coupling between an engine and a transmission (see Japanese Laid-Open Patent Application No. Hei. 8-61469). The reinforcing element, for example, a stiffener, is mounted to provide firm coupling between the engine and the transmission, which are coupled to each other.

In some vehicles, the engine and the transmission are mounted in an uncoupled state to a frame of a vehicle body, because a distance between the engine and the transmission is required to be adjusted to allow a belt converter to be mounted thereto.

To be specific, as shown in FIG. 7, an engine 51 and a transmission 52 are mounted to a frame F with an appropriate distance between the engine 51 and the transmission 52, i.e., an appropriate center distance between an output shaft 53 of the engine 51 and an input shaft 54 of the transmission 52. The center distance between the output shaft 53 and the input shaft 54 is set using a jig. This is because accurate alignment is necessary so that a drive pulley of the belt converter is coupled to the output shaft 53 and a driven pulley of the belt converter is coupled to the input shaft 54.

If the center distance between the engine 51 and the transmission 52 that are thus mounted to the frame F varies due to tension or the like of a belt of the belt converter, then acceleration and deceleration capabilities produced by the belt converter may vary. To inhibit variation in the center distance during an operation of the engine 51, a coupling plate 55 is used to couple the engine 51 and the transmission 52 that are mounted to the frame F. The coupling plate 55 is constructed of a metal plate. The coupling plate 55 is fastened at one end thereof to a suitable location of a crankcase 51a of the engine 51 by a fastener bolt 56 and at an opposite end thereof to a suitable location of a housing 52a of the transmission 52 by the fastener bolt 56. Thus, the center distance between the engine 51 and the transmission 52 is fixed.

In the above described construction, it is necessary to mount the engine 51 and the transmission 52 to the frame F with the jig for alignment of these components, and to fasten the coupling plate 55 to the engine 51 and the transmission 52 by the fastener bolts 56. Furthermore, since the coupling plate 55 is mounted after the engine 51 and the transmission 52 are positioned with respect to the frame F, it is necessary to set larger diameters of bolt holes of the coupling plate 55 to allow deviation in the position of the bolts. This may cause an error in the center distance.

SUMMARY OF THE INVENTION

The present invention addresses the above described conditions, and an object of the present invention is to provide an assembly of an engine and a transmission that facilitates a mounting operation of the engine and the transmission, and allows a positional relationship between the engine and the transmission to be accurately fixed, both in an axial direction of the engine and the transmission, and in a direction of a straight line connecting an output shaft of the engine to an input shaft of the transmission.

According to a first aspect of the present invention, there is provided an assembly of an engine and a transmission, the engine having an output shaft and the transmission having an input shaft, the output shaft and the input shaft extending in parallel to protrude from the assembly, the assembly comprising: a first fitting portion that is formed in a case of the engine and is configured to surround the output shaft; a second fitting portion that is formed in a housing of the transmission and is configured to surround the input shaft; and a coupling element having a first opening fitted to the first fitting portion and a second opening fitted to the second fitting portion, and a center distance between the output shaft and the input shaft is fixed with the coupling element fitted to the first and second fitting portions.

In the above construction, with the coupling element fitted to the fitting portion of the engine and the fitting portion of the transmission, a positional relationship between the output shaft of the engine and the input shaft of the transmission is accurately fixed. In other words, the engine and the transmission are positioned in a direction of a straight line connecting these shafts to each other. This may eliminate a jig to assemble these components. It shall be understood that the fitting portions are not necessarily concentric with the output shaft and the input shaft.

The case of the engine may be provided with a first flat face portion on an end face thereof on the first fitting portion side and the housing of the transmission may be provided with a second flat face portion on an end face thereof on the second fitting portion side. The coupling element may be provided on a surface thereof with a first contact face portion in contact with the first flat face portion and a second contact face portion in contact with the second flat face portion, with the coupling element fitted to the first and second fitting portions.

In this construction, since the first and second flat face portions are in contact with the first and second contact face portions, with the coupling element fitted to the fitting portions of the engine and the transmission, the engine and the transmission are positioned both in the axial direction of the output shaft and the input shaft, and in the direction of the straight line connecting these shafts to each other.

The first contact face portion and the second contact face portion may form one flat plane. The first flat face portion may be perpendicular to the output shaft and the second flat face portion may be perpendicular to the input shaft. This allows the contact face portions of the coupling plate to be present on the same flat plane. As a result, the coupling element may be manufactured easily and an assembly operation is facilitated.

The first fitting portion and the second fitting portion may be placed on a straight line connecting a center of the output shaft to a center of the input shaft as viewed from an axial direction of the output shaft and the input shaft. Such a construction enables the engine and the transmission to be positioned with higher precision in the direction of the straight line connecting the output shaft to the input shaft.

The first fitting portion may form an outer peripheral surface of a part of a cylinder which is concentric with the output shaft, and the second fitting portion may form an outer peripheral surface of a part of a cylinder which is concentric with the input shaft. Thereby, the fitting portions may be easily formed.

In the assembly comprising a belt converter mounted to the output shaft of the engine and the input shaft of the transmission, and a belt converter case configured to house the belt converter, the coupling element may be positioned between the case of the engine and the housing of the transmission, and the belt converter case, with the coupling element fitted to the first and second fitting portions.

The coupling element may be shaped to be substantially symmetric with respect to a straight line connecting a center of the output shaft to a center of the input shaft as viewed from an axial direction of the output shaft and the input shaft, with the coupling plate fitted to the first and second fitting portions. This makes it possible to increase the strength of the coupling element and to position the engine and the transmission with higher precision.

According to another aspect of the present invention, there is provided a utility vehicle comprising: a vehicle body; a sub-frame mounted to the vehicle body; and an assembly of an engine and a transmission, the assembly being mounted to the sub-frame; wherein the engine has an output shaft and the transmission has an input shaft, the output shaft and the input shaft extending in parallel to protrude from the assembly; the assembly including a first fitting portion that is formed in a case of the engine and is configured to surround the output shaft; a second fitting portion that is formed in a housing of the transmission and is configured to surround the input shaft; and a coupling element having a first opening fitted to the first fitting portion and a second opening fitted to the second fitting portion; a belt converter mounted to the output shaft of the engine and the input shaft of the transmission; and a belt converter case configured to house the belt converter; wherein the coupling element is positioned between the case of the engine and the housing of the transmission, and the belt converter case, and is configured to fix a center distance between the input shaft and the output shaft, with the coupling element fitted to the first and second fitting portions.

An embodiment of the assembly and the utility vehicle of the present invention will be described with reference to the accompanying drawings.

DETAILED DESCRIPTION OF THE PREFERRED EMBODIMENT

Figure 1:
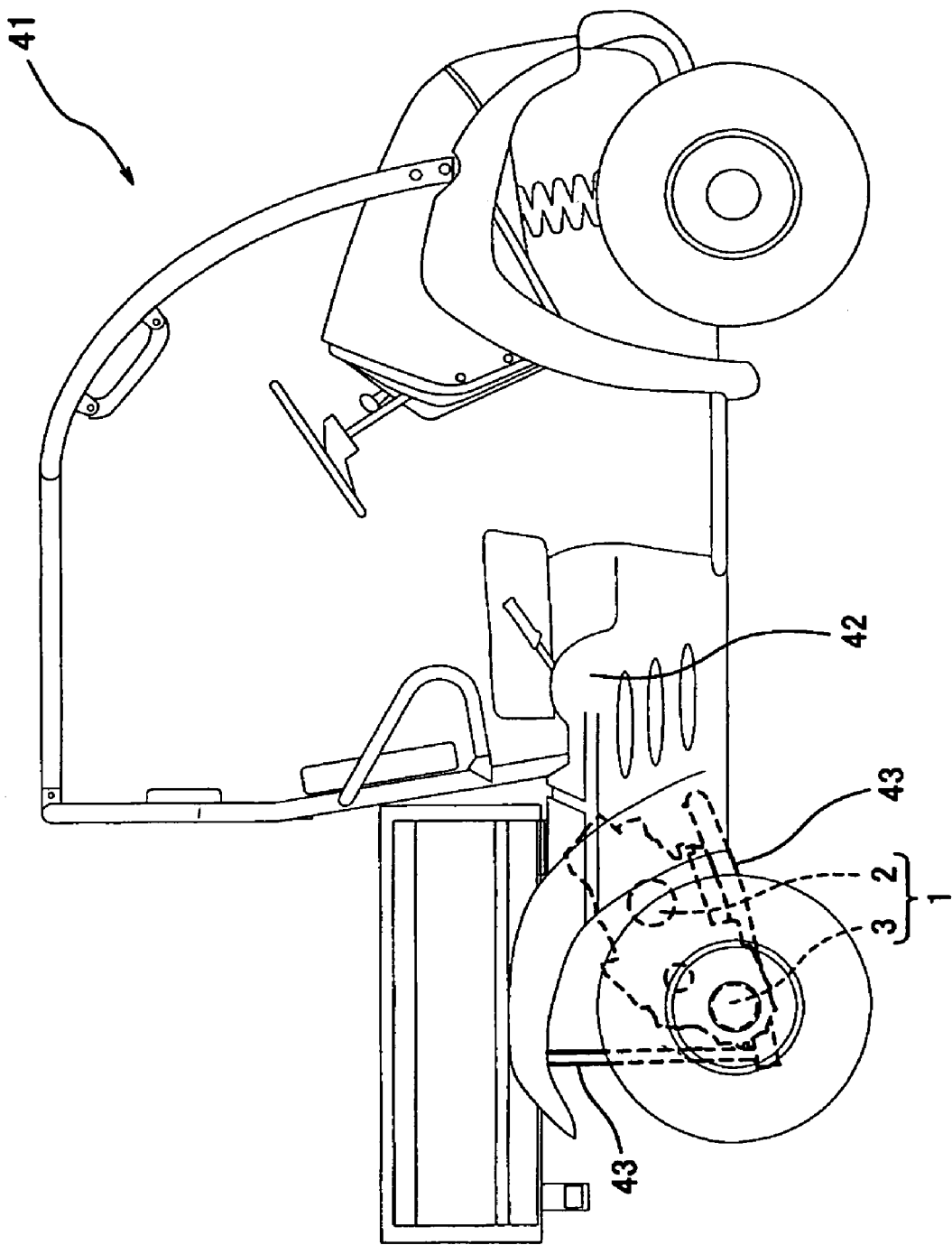
FIG. 1 is a side view of a utility vehicle equipped with an assembly of an engine and a transmission according to an embodiment of the present invention.
Figure 2:
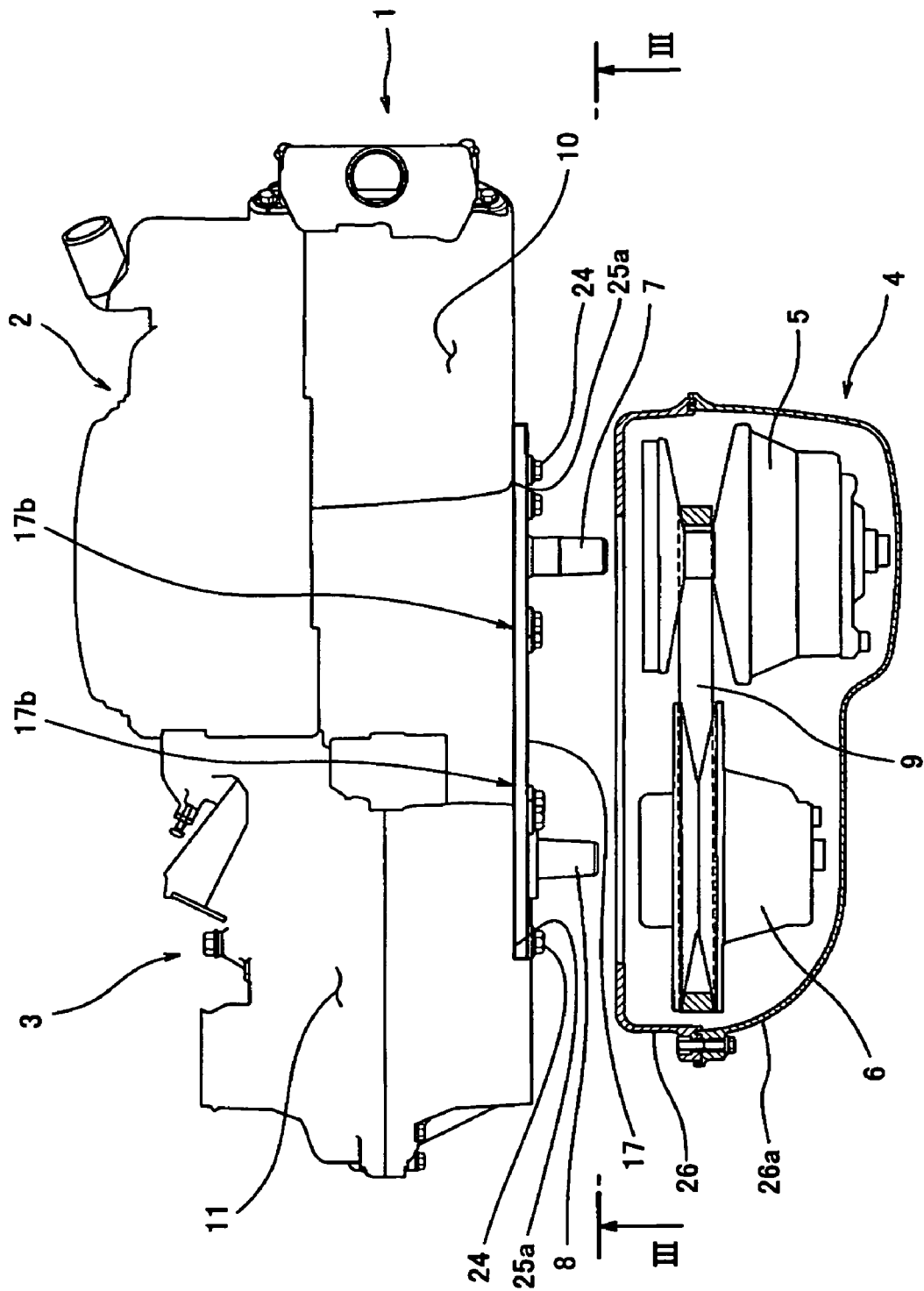
FIG. 2 is a plan view of the assembly of the engine and the transmission according to the embodiment of the present invention.

FIG. 1 shows a lightweight utility vehicle 41 equipped with an assembly 1 of an engine 2 and a transmission 3. The utility vehicle 41 includes a sub-frame 43 that is mounted to a vehicle body 42 so as to be pivotable in a vertical direction and is configured to support rear wheels on a lower side of a rear portion of a vehicle body 42. The assembly 1 including the engine 2 and the transmission 3 is mounted to the sub-frame 43 (see FIGS. 1 and 3). As shown in FIG. 2, a belt converter 4 is mounted to the assembly 1. The belt converter 4 includes a drive pulley 5 coupled to an output shaft 7 of the engine 2 and a driven pulley 6 coupled to an input shaft 8 of the transmission 3. An endless V belt 9 is installed around the pulleys 5 and 6. The belt converter 4 is housed in a belt converter case 26 which is openably covered with a case cover 26a. By opening the case cover 26a, the belt converter 4 becomes accessible.

A crankcase 10 of the engine 2 and a housing 11 of the transmission 3 are mounted to the sub-frame 43. The assembly 1 includes the engine 2, the transmission 3, and a coupling plate (coupling reinforcing element) 17. The coupling plate 17 is configured to couple the engine 2 to the transmission 3.

Figure 3:
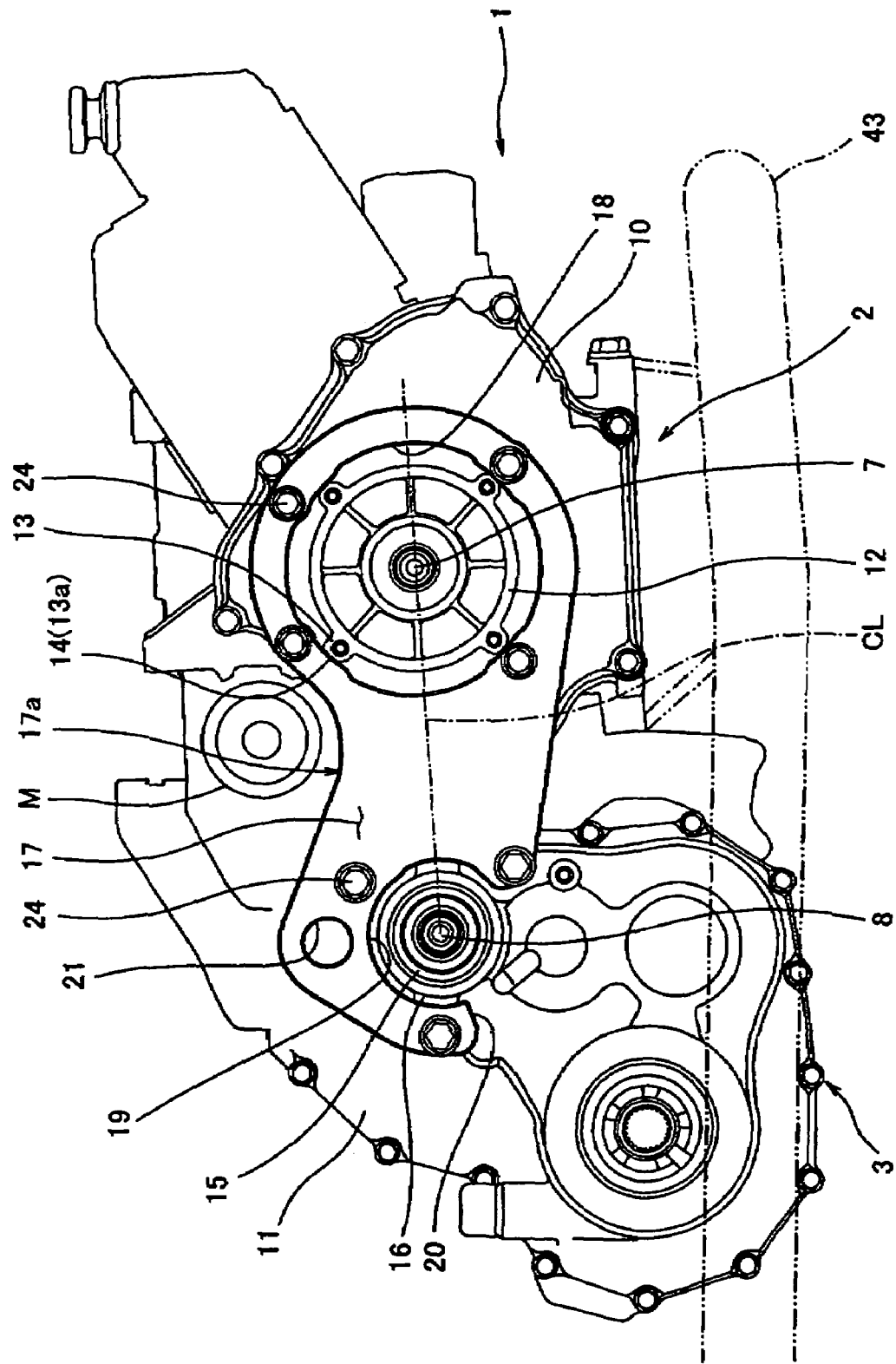
FIG. 3 is a side view of the assembly of FIG. 2 and is a view taken in the direction of arrows substantially along line III-III.
Figure 4:
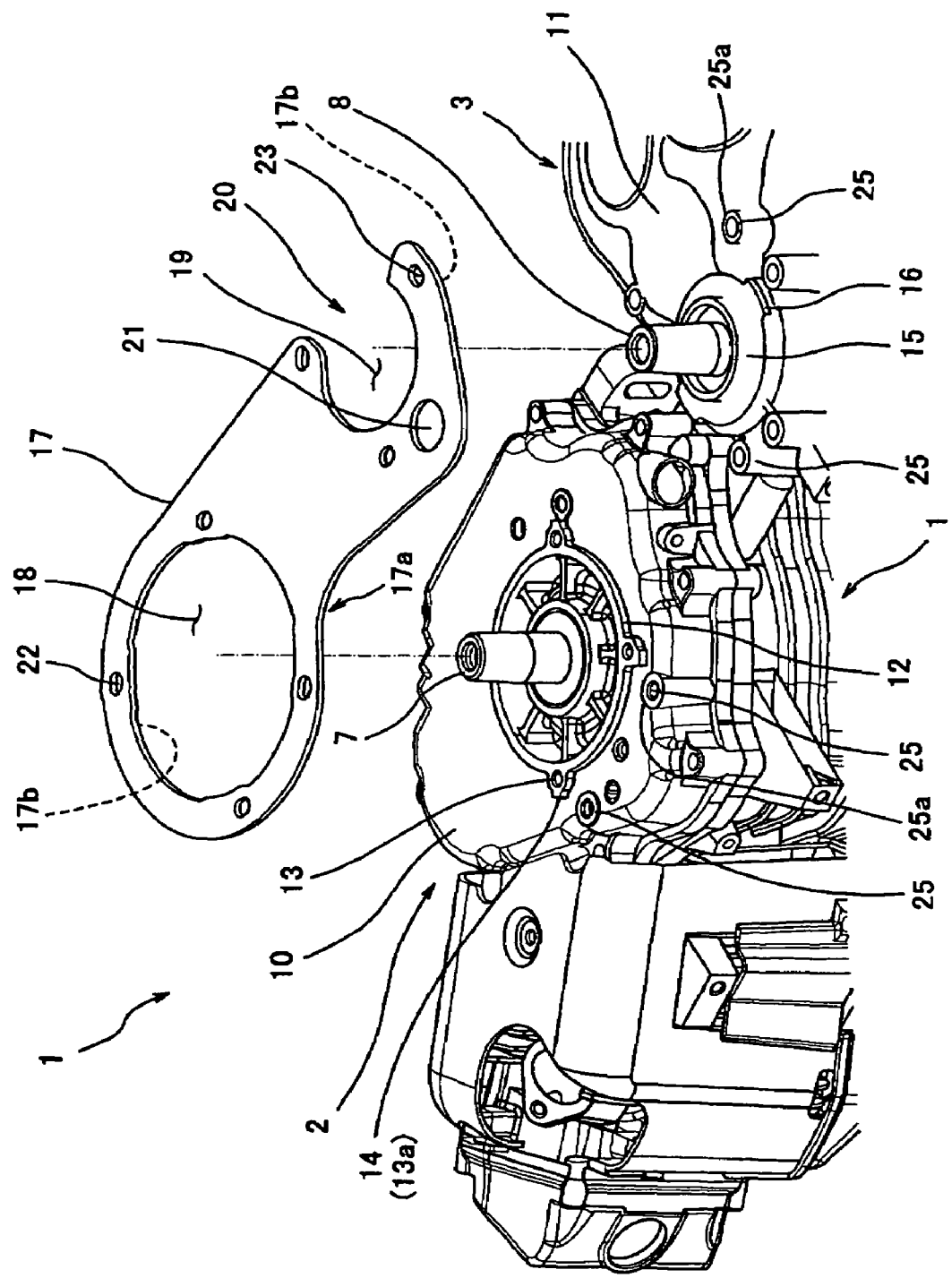
FIG. 4 is a partial perspective view of fitting portions in the engine and the transmission of FIG. 2.

As shown in FIGS. 2 to 4, a circular base portion (first circular base portion) 12 is formed to protrude from an outer surface of the crankcase 10. The first circular base portion 12 concentrically surrounds the output shaft 7 of the engine 2. A plurality of bosses 13 are formed at a peripheral region of the first circular base portion 12 to protrude radially outward. Each boss 13 is provided with a female threaded portion into which a bolt is threaded to fasten the belt converter case 26 to the crankcase 10. An outer surface 13a of each boss 13 which is located radially outward is machine-processed to form an outer peripheral surface of a part of a cylinder which is concentric with the output shaft 7. The outer surface 13a forms a first fitting portion 14 configured to be fitted to the coupling plate 17. In other words, as viewed from an axial direction of the output shaft 7, the first fitting portion 14 forms a part of a circle which is concentric with the output shaft 7.

The housing 11 of the transmission 3 is provided with a circular base portion (second circular base portion) 15 formed to protrude from an outer surface thereof. The second circular base portion 15 concentrically surrounds the input shaft 8 of the transmission 3. Second fitting portions 16 are formed at two locations at a peripheral region of the second circular base portion 15 to be concentric with the input shaft 8 and are configured to be fitted to the coupling plate 17. Each second fitting portion 16 is formed to protrude radially outward from the peripheral region of the second circular base portion 15 along an imaginary straight line CL connecting the output shaft 7 to the input shaft 8, and is of a substantially rectangular parallelepiped shape. An outer surface of each second fitting portion 16 that is located radially outward forms a part of a cylinder which is concentric with the input shaft 8. In other words, as viewed from an axial direction of the input shaft 8, each second fitting portion 16 forms a part of a circle which is concentric with the center of the input shaft 8.

The coupling plate 17 is constructed of a flat plate and has a first opening 18 to which the first fitting portions 14 of the crankcase 10 are fitted, and a second opening 19 to which the second fitting portions 16 of the housing 11 of the transmission 3 are fitted. The first and second openings 18 and 19 are circular. The coupling plate 17 has an outer shape that is substantially symmetric with respect to an imaginary straight line (substantially conforming to the imaginary straight line CL connecting the output shaft 7 of the engine 2 to the input shaft 8 of the transmission 3) connecting centers of the openings 18 and 19 to each other except for a cut portion 20 and a concave portion 17a which will be described later. The first and second openings 18 and 19 have regions machine-processed at locations where the first and second fitting portions 14 and 16 are slidably in contact with the first and second openings 18 and 19, respectively. Each of these regions forms a part of a circle with a radius substantially equal to a curvature radius of the corresponding fitting portions 14 or 16. With such a structure, the coupling plate 17 enables the engine 2 and the transmission 3 to be mounted with improved positioning precision both in axial directions of the output shaft 7 of the engine 2 and of the input shaft 8 of the transmission 3, and in the direction of the straight line connecting the output shaft 7 of the engine 2 to the input shaft 8 of the transmission 3.

The cut portion 20 of the second opening 19 is provided to avoid interference with a convex portion of the housing 11 of the transmission 3. In addition, an aperture 21 with a diameter smaller than that of the second opening 19 is provided near the second opening 19. The aperture 21 serves to avoid interference with the convex portion of the housing 11. In this manner, openings of desired sizes and shapes are formed at suitable locations of the coupling plate 17 to avoid interference with the engine 2 and the transmission 3. Furthermore, as shown in FIG. 3, the concave portion 17a is formed on an outer periphery of a center upper end of a region of the coupling plate 17, which is located between the first and second openings 18 and 19, and is curved to avoid interference with a starter motor M of the engine 2. If there is nothing to interfere with the coupling plate 17, then the cut portion 20, the aperture 21, and the concave portion 17a may be omitted. In that case, the coupling plate 17 can be formed symmetrically with respect to the imaginary straight line CL.

Figure 5:
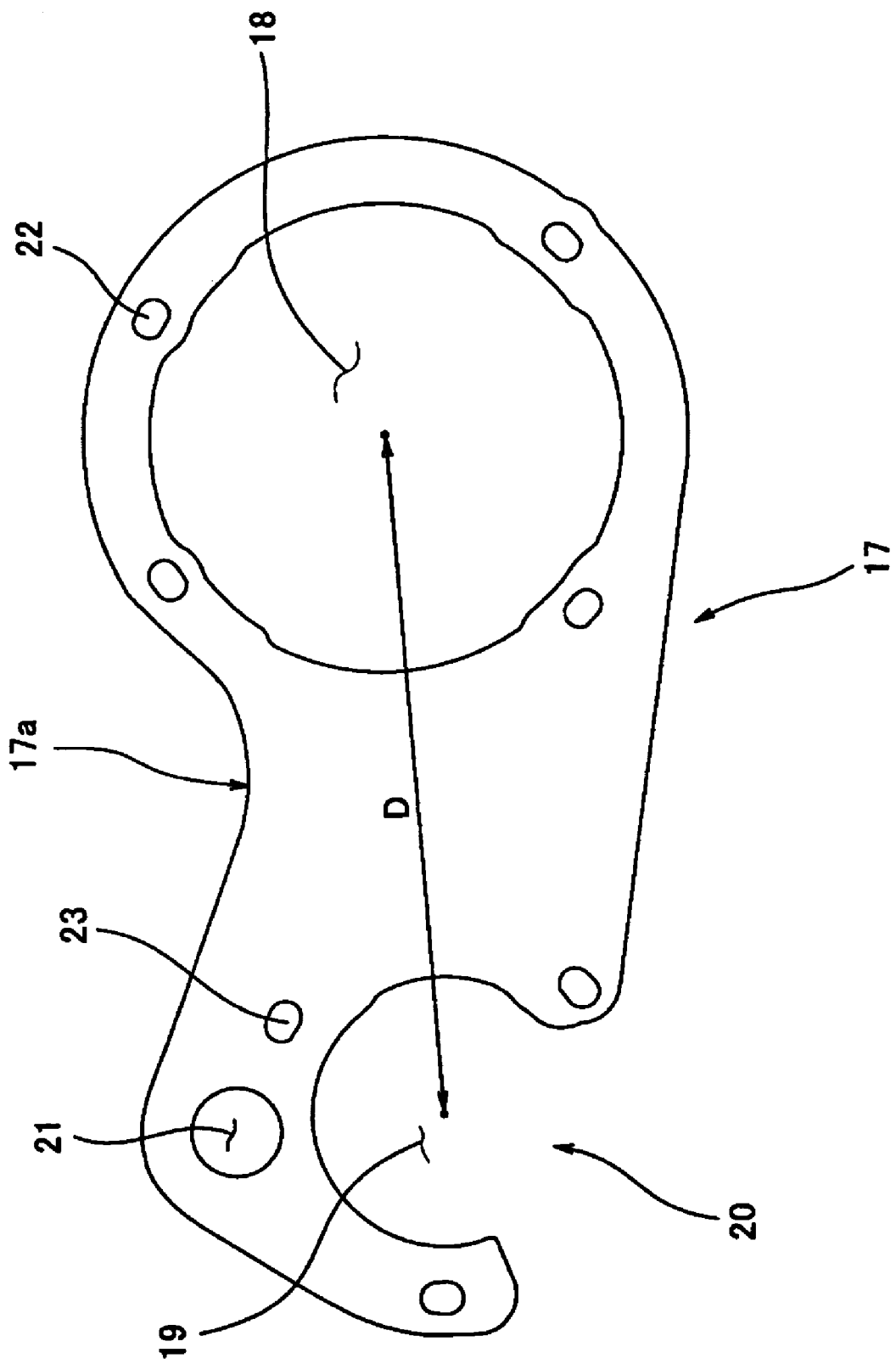
FIG. 5 is a side view of a coupling plate of FIG. 3.

With the engine 2 and the transmission 3 coupled to each other by the coupling plate 17, the center distance between the output shaft 7 of the engine 2 and the input shaft 8 of the transmission 3 is equal to a distance indicated by D in FIG. 5 between a center of the first opening 18 and a center of the second opening 19. This facilitates positioning of each assembly.

As described above, in this embodiment, the fitting portions 14 are formed by a part of the circle which is concentric with the output shaft 7, and the fitting portions 16 are formed by a part of the circle which is concentric with the input shaft 8. The openings 18 and 19 of the coupling plate 17 conform in shape to the fitting portions 14 and 16. Alternatively, the fitting portions 14 and 16 may be eccentric with respect to the output shaft 7 and the input shaft 8, respectively, and are not necessarily a part of the circles so long as the fitting portions 14 and 16 are closely fitted to the first and second openings 18 and 19, respectively, and the center distance between the output shaft 7 and the input shaft 8 is maintained at the designed center distance by the coupling plate 17. In brief, it is necessary to determine the center distance between the first opening 18 and the second opening 19 such that the center distance between the output shaft 7 and the input shaft 8 is fixed to a designated value.

In this embodiment, the coupling plate 17 is fastened to the engine 2 and the transmission 3 by fastener bolts 24. As shown in FIG. 5, a plurality of first bolt holes 22 are formed at a region of the coupling plate 17 which is located slightly radially outward relative to the periphery of the first opening 18 such that first bolt holes 22 are arranged to be spaced a predetermined distance apart from each other in a circumferential direction of the first opening 18. In addition, a plurality of second bolt holes 23 are formed at a region of the coupling plate 17 which is located slightly radially outward relative to the periphery of the second opening 19 such that second bolt holes 23 are arranged to be spaced a predetermined distance apart from each other in a circumferential direction of the second opening 19. As shown in FIG. 4, the crankcase 10 and the transmission house 11 are provided with bosses 25 formed to have flat end faces at locations corresponding to the bolt holes 22 and 23. The bosses 25 are provided with female threaded portions into which the mounting bolts 24 are threaded. Flat end faces 25a of the bosses 25 around the first circular base portion 12 form first flat face portions configured to contact first contact face portions 17b of a rear surface of the coupling plate 17. Flat end faces 25a of the bosses 25 around the second circular base portion 15 form second flat face portions configured to contact second contact face portions 17b of the rear surface of the coupling plate 17. As shown in FIG. 4, the coupling plate 17 is placed in such a manner that the first and second contact face portions 17b of the coupling plate 17 are opposed to the flat face portions 25a of the bosses 25 when the coupling plate 17 is fitted to the first and second fitting portions 14 and 16.

The flat face portions 25a are perpendicular to the output shaft 7 of the engine 2 and the input shaft 8 of the transmission 3. Furthermore, the first flat face portions 25a around the output shaft 7 and the second flat face portion 25a around the input shaft 8 are present on the same flat plane, while the rear surface of the coupling plate 17 is a flat face and hence the first contact face portions 17b around the first opening 18 and the second contact face portions 17b around the second opening 19 form the same flat plane. As a result, by fitting the first and second openings 18 and 19 of the coupling plate 17 to the first and second fitting portions 14 and 16, the contact face portions 17b of the coupling plate 17 cause the engine 2 and the transmission 3 to be positioned in the axial direction of the output shaft 7 and the input shaft 8. Then, by fastening the coupling plate 17 to the engine 2 and the transmission 3, the positional relationship between the engine 2 and the transmission 3 in their axial direction is fixed.

The flat face portions 25a of the engine 2 and the transmission 3 need not form the same flat plane and the contact face portions 17b of the coupling plate 17 need not form the same flat plane. Alternatively, the flat face portions 25a on the engine 2 side and the flat face portions 25a on the transmission 3 side may form a step portion so long as the first flat face portions 25a on the engine 2 side and the second flat face portions 25a on the transmission 3 side are perpendicular to the output shaft 7 and the input shaft 8, respectively, and are parallel with each other. In that case, the contact face portions 17b of the rear surface of the coupling plate 17 may form a step portion so as to conform in shape to the first and second flat face portions 25a. In a further alternative, the flat face portions 25a forming the same flat plane may be tilted with respect to the output shaft 7 and the input shaft 8. In brief, it is necessary to position the engine 2 and the transmission 3 in their axial direction and the direction of the straight line connecting the output shaft 7 of the engine 2 to the input shaft 8 of the transmission 3, with the coupling plate 17 fitted to the fitting portions 14 and 16.

The flat face portions 25a formed on the crankcase 10 and the housing 11 of the transmission 3 are not intended to be limited to the end faces of the bosses 25. The flat face portions 25a may alternatively be formed on an end face of the crankcase 10 on the first fitting portion 14 side and on an end face of the housing 11 of the transmission 3 on the second fitting portion 16 side.

As shown in FIGS. 4 and 5, the bolt holes 22 and 23 of the coupling plate 17 are elongate holes extending in the circumferential direction of the openings 18 and 19. Therefore, the elongate bolt holes 22 and 23 allow slight dimension errors in the circumferential directions of the output shaft 7 of the engine 2 and the input shaft 8 of the transmission 3, with the coupling plate 17 mounted to the assembly 17. Further, the elongate bolt holes 22 and 23 are capable of covering the dimension errors in mounting positions of the engine 2 and the transmission 3 in the sub-frame 43 which may be generated in manufacture.

As shown in FIG. 5, a region of the outer periphery of the coupling plate 17 which is located outward of the first opening 18 is substantially concentric with the first opening 18. In other words, an outer region of the coupling plate 17 which is located outward of the first opening 18 forms a circularly curved band shape with a substantially equal width. Such a shape makes the coupling plate 17 lightweight without reduction of strength.

Figure 6:
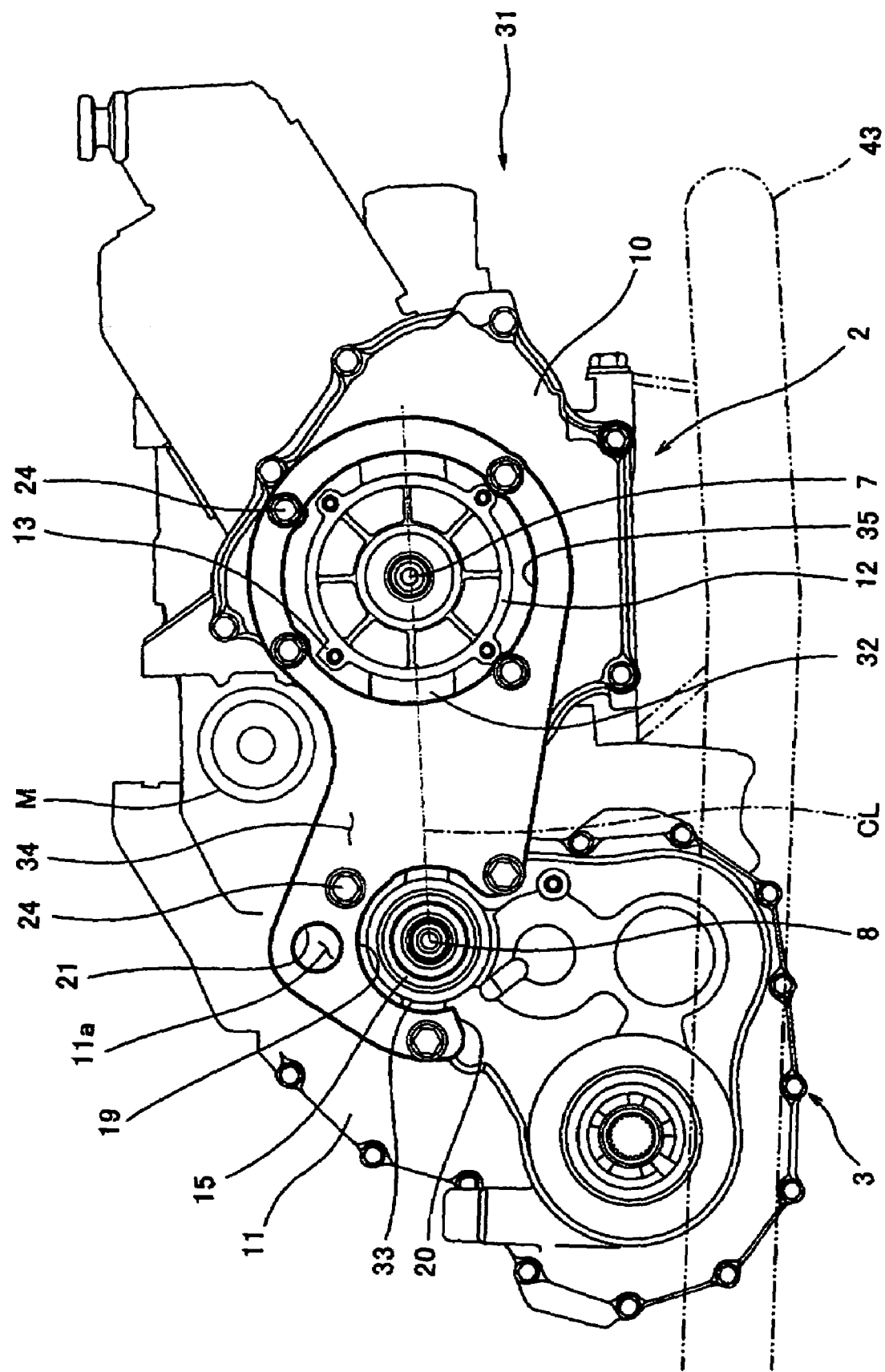
FIG. 6 is a side view of an assembly of an engine and a transmission according to another embodiment.
Figure 7:
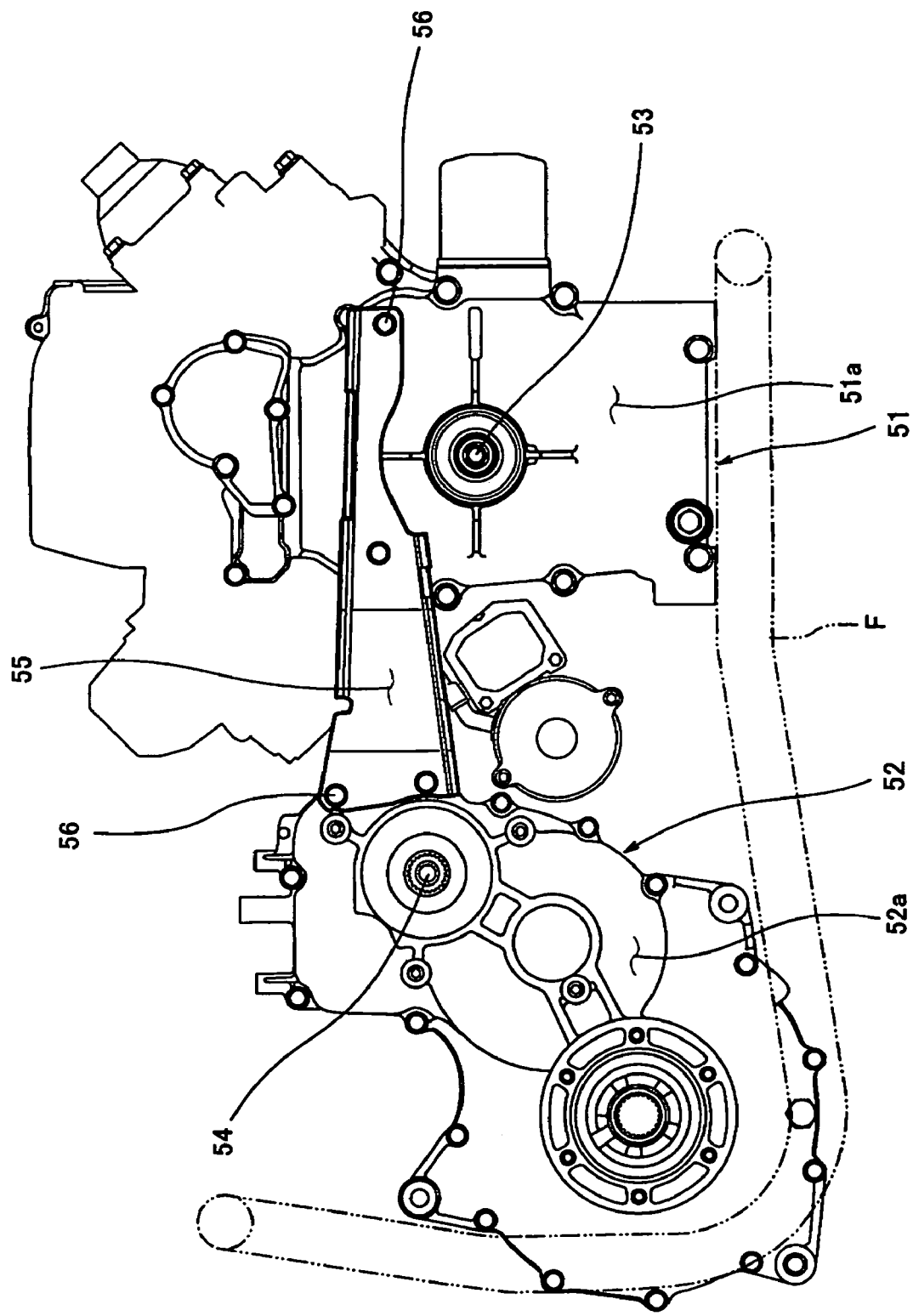
FIG. 7 is a side view showing a conventional construction of an engine and a transmission to which a coupling plate is mounted.

In the assembly 1 of this embodiment, a general-purpose engine is used as the engine 2. The general-purpose engine is typically provided with fitting portions that are formed on a case thereof to be located around the output shaft, and is configured to be fitted to a case that accommodates components to be driven, such as a reduction gear. So provided, the existing fitting portions may be used for fitting the coupling plate 17. On the other hand, in an engine which is not equipped with any fitting portions, it is necessary to form fitting portions configured to be fitted to a coupling plate. One example of such fitting portions is illustrated in FIG. 6. Fitting portions 32 in FIG. 6 are cast at the periphery of the circular base portion 12 integrally with the crankcase 10, and are finished by machine process.

To mount the assembly 1 to the sub-frame 43 of the vehicle body 42, first, the engine 2 and the transmission 3 are temporarily mounted to the sub-frame 43 in such a manner that mounting bolts are inserted through bolt holes of mounting brackets (not shown) provided on the engine 2 and the transmission 3 and the corresponding bolt holes (not shown) of the sub-frame 43. Then, the coupling plate 17 is fitted to the first and second fitting portions 14 and 16 of the engine 2 and the transmission 3. Then, the bolts inserted through the mounting brackets (not shown) and the mounting bolts 24 by which the coupling plate 17 is fastened to the assembly 1 are tightly fastened. Then, the belt converter case 26 is mounted to the crankcase 10 and the housing 11 of the transmission 3, and the belt converter 4 is mounted to the output shaft 7 of the engine 2 and the input shaft 8 of the transmission 3. Then, the belt converter cover 26a is attached to the belt converter case 26.

The coupling plate 17 enables the engine 2 and the transmission 3 to be positioned without a jig which was needed in the conventional construction. Furthermore, since the coupling plate 17 is fitted to the fitting portions 14 and 16 of the engine 2 and the transmission 3, the positional relationship between the engine 2 and the transmission 3 both in the axial direction and in the direction of the straight line connecting the output shaft 7 of the engine 2 to the input shaft 8 of the transmission 3 is accurately fixed.

FIG. 6 shows an assembly 31 of the engine 2 and the transmission 3. The assembly 31 is substantially identical in construction to the assembly 1 (FIGS. 2 to 4), except for positions of the first fitting portions 32 and a coupling plate 34 formed to conform in shape to the first fitting portions 32. Since the other components are identical to those of the first assembly 1, they are identified by the same reference numbers and will not be further described.

As shown in FIG. 6, the first fitting portions 32 are formed to protrude radially outward along the imaginary straight line CL connecting the output shaft 7 to the input shaft 8. Second fitting portions 33 are identical in structure to those of the first assembly 1. That is, the first and second fitting portions 32 and 33 are formed to protrude radially outward along the imaginary straight line CL. A first opening 35 of the coupling plate 34 is precisely machine processed to be closely fitted to the first fitting portions 32. As a result, the positional relationship between the engine 2 and the transmission 3 in the direction of the straight line connecting the output shaft 7 to the input shaft 8 is accurately fixed, with the coupling plate 34 fitted to the first and second fitting portions 32 and 33.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An assembly of an engine and a transmission, the engine having an output shaft and the transmission having an input shaft, the output shaft and the input shaft extending in parallel to protrude from the assembly, the assembly comprising:
    a first fitting portion that is formed in a case of the engine and is configured to surround the output shaft;
    a second fitting portion that is formed in a housing of the transmission and is configured to surround the input shaft; and
    a coupling element having a first opening fitted to the first fitting portion and a second opening fitted to the second fitting portion;
    wherein a center distance between the output shaft and the input shaft is fixed with the coupling element fitted to the first and second fitting portions.

2. The assembly according to claim 1, wherein the case of the engine is provided with a first flat face portion on an end face thereof on the first fitting portion side and the housing of the transmission is provided with a second flat face portion on an end face thereof on the second fitting portion side;
    and wherein the coupling element is provided on a surface thereof with a first contact face portion in contact with the first flat face portion and a second contact face portion in contact with the second flat face portion, with the coupling element fitted to the first and second fitting portions.

3. The assembly according to claim 2, wherein the first contact face portion and the second contact face portion form one flat plane; and wherein the first flat face portion is perpendicular to the output shaft and the second flat face portion is perpendicular to the input shaft.

4. The assembly according to claim 1, wherein the first fitting portion and the second fitting portion are placed on a straight line connecting a center of the output shaft to a center of the input shaft as viewed from an axial direction of the output shaft and the input shaft.

5. The assembly according to claim 4, wherein the first fitting portion forms an outer peripheral surface of a part of a cylinder which is concentric with the output shaft and the second fitting portion forms an outer peripheral surface of a part of a cylinder which is concentric with the input shaft.

6. The assembly according to claim 1, further comprising:
    a belt converter mounted to the output shaft of the engine and the input shaft of the transmission; and
    a belt converter case configured to house the belt converter;
    wherein the coupling element is positioned between the case of the engine and the housing of the transmission, and the belt converter case, with the coupling element fitted to the first and second fitting portions.

7. The assembly according to claim 1, wherein the coupling element is shaped to be substantially symmetric with respect to a straight line connecting a center of the output shaft to a center of the input shaft as viewed from an axial direction of the output shaft and the input shaft with the coupling plate fitted to the first and second fitting portions.

8. A utility vehicle comprising:
a vehicle body;
a sub-frame mounted to the vehicle body; and
an assembly of an engine and a transmission, the assembly being mounted to the sub-frame;
wherein the engine has an output shaft and the transmission has an input shaft, the output shaft and the input shaft extending in parallel to protrude from the assembly;
wherein the assembly includes:
  a first fitting portion that is formed in a case of the engine and is configured to surround the output shaft;
  a second fitting portion that is formed in a housing of the transmission and is configured to surround the input shaft; and
  a coupling element having a first opening fitted to the first fitting portion and a second opening fitted to the second fitting portion;
  a belt converter mounted to the output shaft of the engine and the input shaft of the transmission; and
a belt converter case configured to house the belt converter; and
wherein the coupling element is positioned between the case of the engine and the housing of the transmission, and the belt converter case, and is configured to fix a center distance between the input shaft and the output shaft, with the coupling element fitted to the first and second fitting portions.

* * * * *